US012406052B2

(12) United States Patent
Cox et al.

(10) Patent No.: US 12,406,052 B2
(45) Date of Patent: Sep. 2, 2025

(54) AUTOMATIC COMPLIANT PASSWORD GENERATION

(71) Applicant: INTERNATIONAL BUSINESS MACHINES CORPORATION, Armonk, NY (US)

(72) Inventors: Benjamin David Cox, Newbury (GB); Joseph Sayer, Bury St Edmunds (GB); Andrew David Lyell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 17/830,789

(22) Filed: Jun. 2, 2022

(65) Prior Publication Data
US 2023/0394135 A1 Dec. 7, 2023

(51) Int. Cl.
G06F 21/46 (2013.01)

(52) U.S. Cl.
CPC .................. G06F 21/46 (2013.01)

(58) Field of Classification Search
CPC ............... G06F 21/46; H04L 9/0861
See application file for complete search history.

(56) References Cited

U.S. PATENT DOCUMENTS 5,978,942 A * 11/1999 Rockoff ........... G01R 31/31907
714/724
6,079,021 A * 6/2000 Abadi ..................... G06F 21/46
713/184
6,643,784 B1 * 11/2003 McCulligh ............ H04L 63/083
704/10
7,111,265 B1 * 9/2006 Tan ....................... G06F 30/392
716/124
7,171,679 B2 * 1/2007 Best ...................... H04L 63/083
726/28
7,434,061 B2 * 10/2008 Moseley ................. G06F 21/46
713/184
7,545,930 B1 * 6/2009 Shields ................. G07F 7/1008
380/264
7,644,350 B2 * 1/2010 Piersol .................. G06F 40/226
715/224
7,934,101 B2 * 4/2011 Stieglitz .............. H04L 63/0892
726/19

(Continued)

FOREIGN PATENT DOCUMENTS

WO   WO-2013128190 A1 * 9/2013 ............. G06F 21/31

OTHER PUBLICATIONS

Horsch et al., Password Requirements Markup Language, Springer, ACISP 2016 (Year: 2016).*

(Continued)

Primary Examiner — David Garcia Cervetti
(74) Attorney, Agent, or Firm — Heather Johnston

(57) ABSTRACT

A method, computer program product, and computer system for automatic compliant password generation. The method includes activating password generation for a given input field and gathering information from one or more sources associated with the input field. The method includes determining password criteria from the gathered information and generating bound requirements based on the determined password criteria. The method further includes generating a randomized password meeting the bound requirements.

20 Claims, 7 Drawing Sheets

(56) References Cited

U.S. PATENT DOCUMENTS

| | | | | |
|---|---|---|---|---|
| 8,271,799 | B2* | 9/2012 | Wang | G06F 21/83 380/42 |
| 8,370,925 | B2* | 2/2013 | Childress | G06F 21/46 380/247 |
| 8,560,860 | B2* | 10/2013 | Nickell | G06F 21/46 715/705 |
| 8,738,934 | B2* | 5/2014 | Lurey | G06F 21/602 713/193 |
| 8,819,415 | B2* | 8/2014 | Choi | H04L 9/0891 713/155 |
| 9,049,189 | B2* | 6/2015 | Goel | H04L 63/083 |
| 9,270,670 | B1* | 2/2016 | Fitzgerald | G06F 21/45 |
| 9,323,919 | B2* | 4/2016 | Jancula | G06F 21/46 |
| 9,323,944 | B2* | 4/2016 | Waltermann | G06F 21/46 |
| 9,621,348 | B2* | 4/2017 | Bahjat | H04L 9/3226 |
| 9,626,506 | B1* | 4/2017 | Shetty | H04L 63/0846 |
| 9,647,839 | B2* | 5/2017 | Lucas | H04L 63/083 |
| 9,648,011 | B1* | 5/2017 | Mattsson | H04L 9/3226 |
| 9,652,606 | B2* | 5/2017 | Cavanagh | H04L 63/168 |
| 9,674,175 | B2* | 6/2017 | Hitchcock | H04L 63/0281 |
| 9,798,872 | B2* | 10/2017 | Shetty | G06F 16/90344 |
| 10,033,724 | B2* | 7/2018 | Donohue | H04L 63/0838 |
| 10,055,575 | B2 | 8/2018 | Adams | |
| 10,162,961 | B1* | 12/2018 | Shitrit | G06F 21/46 |
| 10,171,438 | B2* | 1/2019 | Dinia | H04L 63/083 |
| 10,182,048 | B1* | 1/2019 | Sabanayagam | H04W 4/14 |
| 10,262,129 | B1* | 4/2019 | Gupta | G06F 16/3344 |
| 10,331,879 | B1* | 6/2019 | Jiang | H04L 63/083 |
| 10,475,018 | B1* | 11/2019 | Hitchcock | G06Q 20/227 |
| 10,546,116 | B2* | 1/2020 | Sahin | H04L 9/0863 |
| 10,614,208 | B1* | 4/2020 | Edwards | G06F 21/45 |
| 11,062,083 | B1* | 7/2021 | Hitchcock | G06F 40/274 |
| 11,093,594 | B2* | 8/2021 | Cunico | G06F 21/46 |
| 11,095,682 | B1* | 8/2021 | Xu | H04L 63/083 |
| 11,218,460 | B2* | 1/2022 | Linecker | H04L 63/08 |
| 11,444,936 | B2* | 9/2022 | Canavor | G06F 21/31 |
| 11,475,120 | B2* | 10/2022 | Gersten | G06F 21/6245 |
| 11,508,383 | B2* | 11/2022 | Kim | G06F 21/6209 |
| 11,727,108 | B2* | 8/2023 | Learned | G06F 16/951 726/6 |
| 11,868,710 | B2* | 1/2024 | Li | G06F 16/35 |
| 11,930,108 | B1* | 3/2024 | Hodgman | G06F 21/45 |
| 12,242,594 | B2* | 3/2025 | Rodriguez Bravo | G06F 21/46 |
| 2002/0026573 | A1* | 2/2002 | Park | H04L 63/0428 713/155 |
| 2003/0041251 | A1* | 2/2003 | Kumhyr | G06F 21/31 713/184 |
| 2003/0078949 | A1* | 4/2003 | Scholz | G06F 40/174 715/234 |
| 2003/0078960 | A1* | 4/2003 | Murren | H04L 67/565 709/203 |
| 2003/0131266 | A1* | 7/2003 | Best | H04L 63/20 713/184 |
| 2004/0073815 | A1* | 4/2004 | Sanai | G06F 21/46 726/6 |
| 2004/0168068 | A1* | 8/2004 | Goal | G06F 21/46 713/184 |
| 2004/0205525 | A1* | 10/2004 | Murren | G06F 40/174 715/234 |
| 2005/0071645 | A1* | 3/2005 | Girouard | G06F 21/31 713/183 |
| 2007/0006301 | A1* | 1/2007 | Nickell | G06F 21/46 726/22 |
| 2007/0277044 | A1* | 11/2007 | Graf | G07F 7/1008 713/185 |
| 2008/0114986 | A1* | 5/2008 | Morris | G06F 21/46 726/19 |
| 2009/0019514 | A1* | 1/2009 | Hazlewood | H04L 63/0281 726/1 |
| 2009/0019533 | A1* | 1/2009 | Hazlewood | H04L 63/083 726/5 |
| 2009/0150991 | A1* | 6/2009 | Hoey | H04L 63/0807 726/18 |
| 2009/0178106 | A1* | 7/2009 | Feng | H04L 63/20 726/1 |
| 2009/0282258 | A1* | 11/2009 | Burke | G06F 21/6281 713/184 |
| 2009/0292981 | A1* | 11/2009 | Akiyama | G06F 40/166 715/780 |
| 2010/0263029 | A1* | 10/2010 | Tohmo | H04L 9/3228 713/184 |
| 2011/0126289 | A1* | 5/2011 | Yue | G06F 21/554 726/26 |
| 2011/0271118 | A1* | 11/2011 | Mahmoud Abd Alla | G06F 21/31 726/7 |
| 2014/0026211 | A1* | 1/2014 | Nickell | G06F 21/46 726/18 |
| 2014/0298432 | A1* | 10/2014 | Brown | G06F 21/34 726/6 |
| 2014/0373088 | A1* | 12/2014 | Aggarwal | G06F 21/46 726/1 |
| 2015/0082046 | A1* | 3/2015 | Lucas | H04L 63/083 713/184 |
| 2015/0128234 | A1* | 5/2015 | Xavier | H04L 63/0861 726/6 |
| 2015/0365396 | A1* | 12/2015 | Dubey | G06F 3/04886 713/183 |
| 2016/0212141 | A1* | 7/2016 | Banerjee | H04L 63/0846 |
| 2016/0357956 | A1* | 12/2016 | Elshishiny | H04L 63/083 |
| 2017/0011213 | A1* | 1/2017 | Cavanagh | H04L 67/02 |
| 2017/0011214 | A1* | 1/2017 | Cavanagh | H04L 63/0846 |
| 2017/0054711 | A1* | 2/2017 | Shen | G06Q 30/0204 |
| 2017/0085592 | A1* | 3/2017 | Chan | H04L 63/083 |
| 2017/0132115 | A1* | 5/2017 | Misra | G06F 40/289 |
| 2017/0132409 | A1* | 5/2017 | Elshishiny | G06F 21/31 |
| 2017/0155635 | A1* | 6/2017 | Venigalla | H04L 63/0861 |
| 2017/0161474 | A1* | 6/2017 | Giatilis | G06F 21/31 |
| 2017/0193216 | A1* | 7/2017 | Lucas | H04L 63/083 |
| 2017/0308695 | A1* | 10/2017 | Adams | H04L 63/06 |
| 2018/0004934 | A1* | 1/2018 | Venkataramani | H04L 9/0891 |
| 2018/0012014 | A1* | 1/2018 | Sahin | G06F 21/577 |
| 2018/0054310 | A1* | 2/2018 | Shimizu | H04L 9/3226 |
| 2018/0176188 | A1* | 6/2018 | Zhu | H04L 9/3271 |
| 2018/0260557 | A1 | 9/2018 | Rockwell | |
| 2018/0288019 | A1* | 10/2018 | Dinia | H04L 63/083 |
| 2019/0123898 | A1* | 4/2019 | Martín Rodríguez | H04L 9/12 |
| 2019/0220590 | A1* | 7/2019 | De Jonge | H04L 9/0643 |
| 2019/0260751 | A1* | 8/2019 | Kale | H04L 63/10 |
| 2020/0151089 | A1* | 5/2020 | Bakshi | G06F 11/3696 |
| 2021/0176059 | A1* | 6/2021 | Hertrich | H04L 9/3271 |
| 2021/0240815 | A1* | 8/2021 | Tsou | G06F 21/46 |
| 2021/0306315 | A1* | 9/2021 | Wright | G06F 21/45 |
| 2022/0116385 | A1* | 4/2022 | Hertrich | H04L 9/0825 |
| 2022/0222332 | A1* | 7/2022 | Learned | G06F 16/9035 |
| 2022/0311770 | A1* | 9/2022 | Shieh | H04L 63/083 |
| 2023/0065220 | A1* | 3/2023 | Rodriguez Bravo | G06F 21/46 |
| 2023/0084751 | A1* | 3/2023 | Mondello | H04L 63/0838 726/19 |
| 2023/0146095 | A1* | 5/2023 | Kim | G10L 15/04 726/19 |
| 2023/0169161 | A1* | 6/2023 | Konda | G06F 21/45 726/26 |
| 2023/0244777 | A1* | 8/2023 | Miracolo | G06N 5/04 726/6 |
| 2023/0327855 | A1* | 10/2023 | Li | H04L 9/14 |
| 2023/0379320 | A1* | 11/2023 | Chavali | H04L 63/0853 |
| 2024/0007455 | A1* | 1/2024 | Sarkar | H04L 63/083 |
| 2025/0086266 | A1* | 3/2025 | Mondello | H04L 63/0838 |
| 2025/0131114 | A1* | 4/2025 | Stephens | G06F 21/6209 |
| 2025/0184129 | A1* | 6/2025 | Dange | H04L 9/3226 |

OTHER PUBLICATIONS

Grilo et al., Verified Password Generation from Password Composition Policies, Springer, IFM 2022 (Year: 2022).*

Horsch et al., Password Policy Markup Language, 2016 (Year: 2016).*

(56) References Cited

OTHER PUBLICATIONS

"Providing Site Password Criteria Through Anonymised Consensus and Dissemination", Authors et. al.: Disclosed Anonymously, IP.com No. IPCOM000265510D, IP.com Electronic Publication Date: Apr. 20, 2021, 4 pps.

Mell et al., "The NIST Definition of Cloud Computing", National Institute of Standards and Technology, U.S. Department of Commerce, NIST Special Publication 800-145, Sep. 2011, 7 pages.

Sherwin, Katie, "Password Creation: 3 Ways to Make it Easier", Apr. 26, 2015, 10 pps., Nielsen Norman Group, <https://www.nngroup.com/articles/password-creation/>.

* cited by examiner

AUTOMATIC COMPLIANT PASSWORD GENERATION

BACKGROUND

The present invention relates to computer security, and more specifically, to automatic compliant password generation.

A user signing up for new services online or creating an account will typically be required to create a password in combination with a username that forms access credentials. Such passwords usually have a list of criteria for the required format in order to be compliant as access credentials. For example, such criteria may require a password to have at least two special characters, to use at least one number, and to be least 8 characters long.

Sometimes, the password criteria are not visible at the time of entering the password and only appear as error messages after the user has attempted to create it. Sometimes these error messages do not present the entire list of criteria but only one or some criteria which have not been met.

Password managers have become increasingly common in order to manage the large number of credentials required for a user, while keeping good practice, such as a unique password for each service. Password managers have been enhanced with password generators, which automatically create a random password. Password creation by password managers may be configured to be customized with parameters of a password such as the length of the password and the number of numerical digits or special characters.

SUMMARY

According to an aspect of the present invention there is provided a computer-implemented method for automatic compliant password generation, said method provided by one or more processors of a computing system and comprising: activating password generation for a given input field; gathering information from one or more sources associated with the input field; determining password criteria from the gathered information; generating bound requirements based on the determined password criteria; and generating a randomized password meeting the bound requirements.

According to another aspect of the present invention there is provided a system for automatic compliant password generation, comprising: a processor and a memory configured to provide computer program instructions to the processor to execute functions of the components: an activating component for activating password generation for a given input field; a password criteria gathering component for gathering information from one or more sources associated with the input field; a criteria determining component for determining password criteria from the gathered information; a bound generating component for generating bound requirements based on the determined password criteria; and a password generating component for generating a randomized password meeting the bound requirements.

According to another aspect of the present invention there is provided a computer program product for automatic compliant password generation, the computer program product comprising a computer readable storage medium having program instructions embodied therewith, the program instructions executable by a processor to cause the processor to: activate password generation for a given input field; gather information from one or more sources associated with the input field; determine password criteria from the gathered information; generate bound requirements based on the determined password criteria; and generate a randomized password meeting the bound requirements.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. Embodiments of the present invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of the present invention recognize that there is no link between the password criteria of a service and a password generator, requiring a user to assume or interpret the password criteria, if known, and manually customize the password generator's parameters to match.

Embodiments of a method, system, and computer program product are provided for automatic compliant password generation. The described method improves password generation by detecting or determining the criteria required for the password for a service or account and using the detected criteria as parameters input to the password generator.

The method may be used as a stand-alone process or within password generators used by password managers. The described method provides an improved workflow for a password manager that automatically generates compliant passwords, instead of having to use human comprehension of a set of written criteria, or repetition of trial and error.

The described password generator may be activated via a manual user action or by automated actions such as by navigation to a password input page or by detecting a password input field. One or more different sources associated with the password input field are accessed to determine required password criteria. Accessing the different sources associated with the password input field may involve extracting criteria information from available information at the sources or via trial inputs into the input field.

Using the described method, embodiments enable automatic generation of passwords, such that the user can be confident of all the password criteria imposed by that service will be met without trial and error by the user. The automatic compliant password generation is an improvement in the technical field of computer security generally and more particularly in the technical field of controlling access to data.

Figure 1:
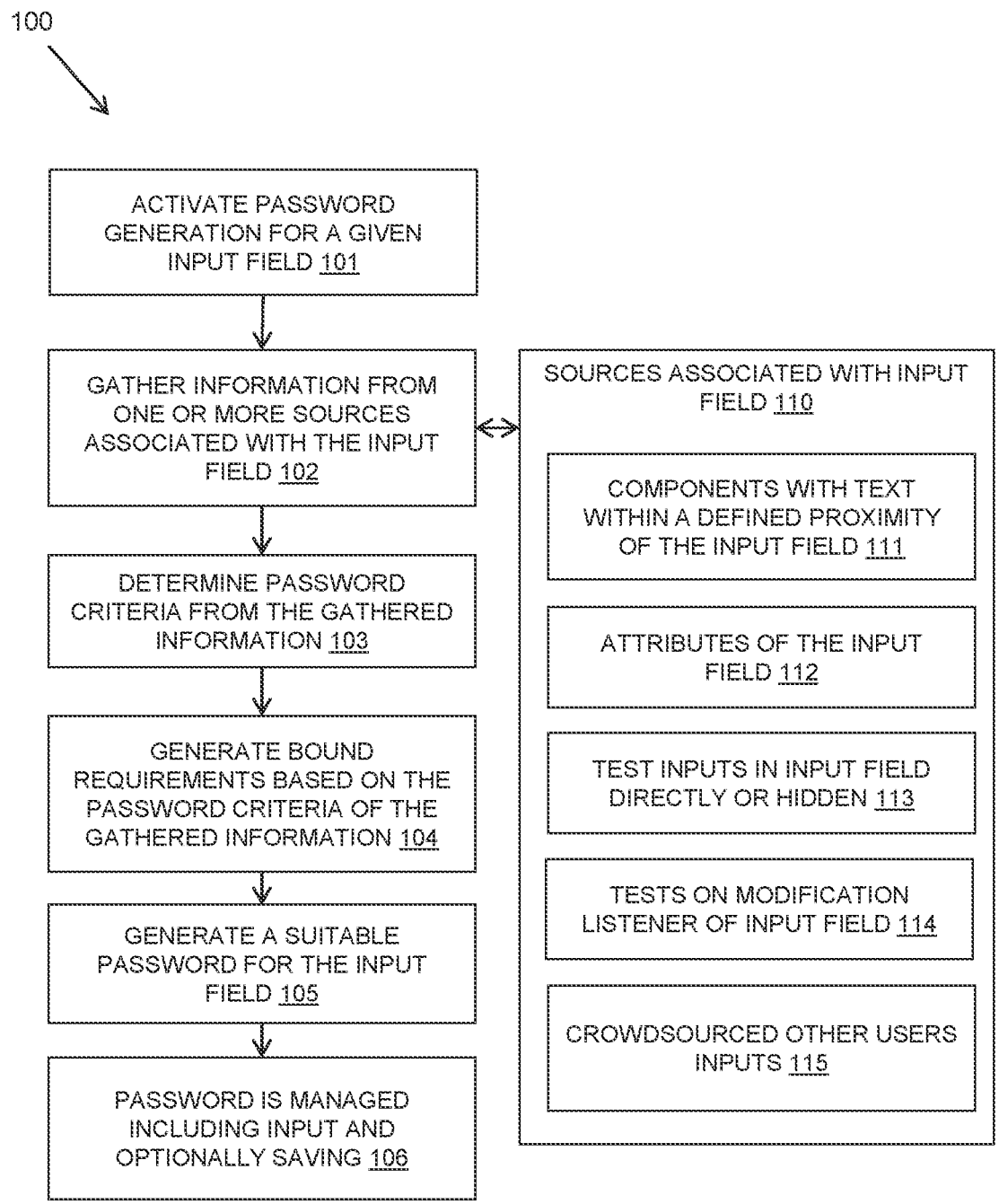
FIG. 1 is a flow diagram of an example embodiment of a method in accordance with embodiments of the present invention.

Referring to FIG. 1, a flow diagram 100 shows an example embodiment of the described method for automatic compliant password generation. The method may be carried out by or called by a password manager component associated with an input field for a password. A password manager may be triggered by navigating to a page, inputting a username in a field, or putting focus in any one of the input fields.

The method includes activating 101 password generation for a given input field. The activation may be a manual action, or the activation may be automatic as the password input field is detected by a password manager, which offers to generate a password for the input field.

The method gathers 102 information from one or more sources associated with the input field that provide information of required password criteria.

The one or more sources 110 associated with an input field may include one or more of the following sources: components 111 with text within a predefined proximity of the input field; attributes 112 of the input field; test inputs 113 into the input field directly or as hidden inputs; test inputs 114 on a modification listener (also known as a property-change listener) of the input field; and anonymously crowd-sourced other user inputs 115, particularly of other users of a common password manager service or a common password manager component.

The method includes determining 103 password criteria from the gathered information and generating 104 bound or limit requirements of the parameters of the password based on the determined password criteria. For example, a lower bound of a minimum password length of p characters may be detected or an upper bound of at most q characters may be detected.

The method includes generating 105 a randomized password meeting the bound requirements. The password may be used and managed 106 including input and optionally saving the password as carried out by a password manager. The use may include the password being inserted into the input field, being copied to the clipboard, being saved to the password manager, or a combination of these actions.

Figure 2:
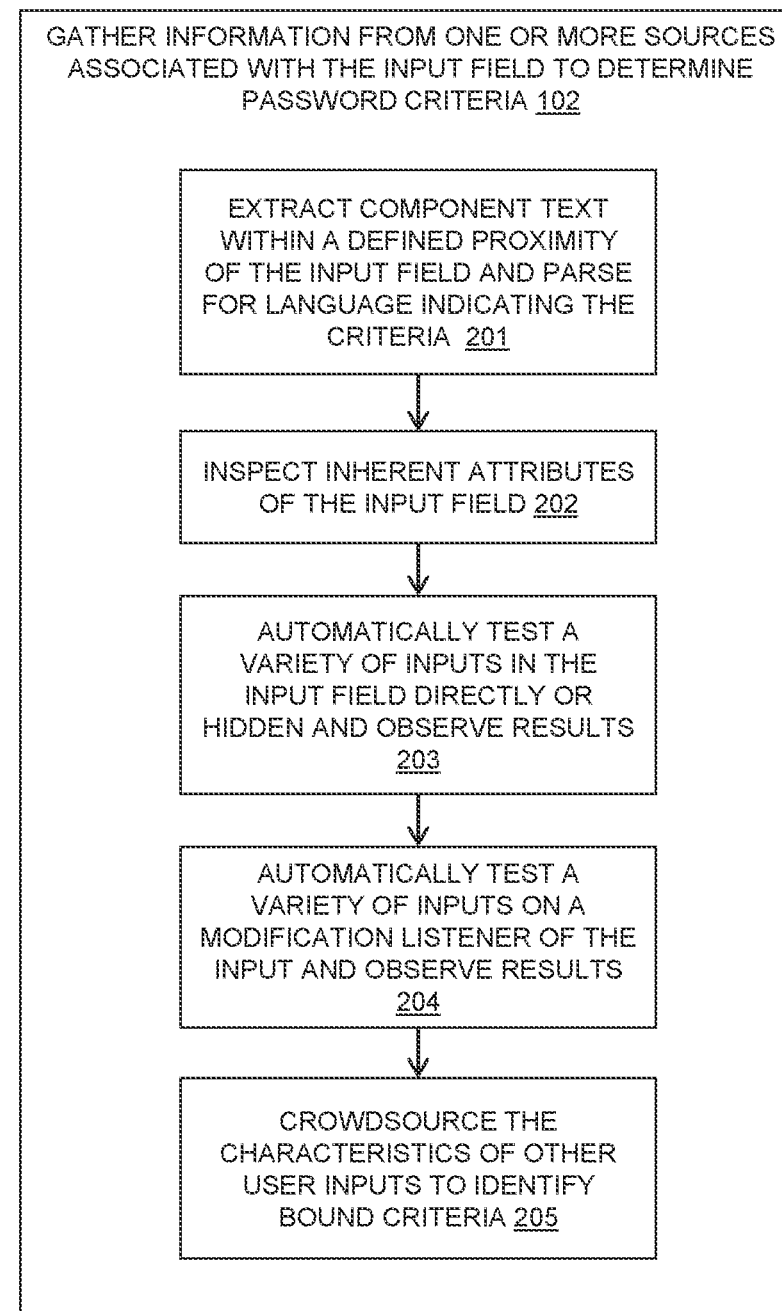
FIG. 2 is a flow diagram of an aspect of the example embodiment of FIG. 1 in accordance with embodiments of the present invention.

Referring to FIG. 2, a flow diagram 200 show the step of FIG. 1 of gathering 102 information from one or more sources associated with the input field. This may include the following steps that may be carried out in any order and not all the steps are required to be carried out.

The method may extract 201 text of components within a defined proximity of the input field. The extracted text may be parsed for language indicating password criteria. Nearby components may be detected for language indicating the criteria. For example, there may be labels nearby that indicate "must be between 8 and 20 characters long; must have at least one number; must have at least one symbol". Natural language processing (NLP) is applied to extract the criteria information from these labels.

As an example, in the context of a webpage, an example method may be used or a combination of two methods may be used. The first method may be a hierarchical method that may perform an assessment starting at the input, going to the Nth parent of that input on the webpage and searching for relevant language in all descendants of that Nth parent. The second may be location-based and may scan for elements that are within a particular position threshold of the input on-screen and search them for relevant language. Consideration may also be given as to whether elements are hidden or not. This may be implemented through a browser extension which is able to inspect the webpage content.

The method may inspect 202 inherent attributes of the input field. For example, Hypertext Markup Language (HTML) has a pattern attribute that may specify regular expressions which the input value must match in order for the value to pass constraint validation. For example, these may be "minlength" and "maxlength" attributes on a password <input> tag. These can indicate the required format and length of the password.

The method may automatically test 203 trial inputs into the input field or a copy of the input field. A number of combinations of password may be tried in the input field, from simple to complex, to see whether they have an effect on the page elements. For example, an effect may include popping up an error box that can be parsed for the criteria that were not met by the trial input or changing the enablement status of the form's submit button. This may take place directly on the input that the user sees or, alternatively, this may be conducted on a hidden copy of the same element.

The method may automatically test 204 trial inputs into a modification listener of the input field. Input of several combinations of a password may be tried on the listeners that back modification of the input field, avoiding changing the input field directly.

If a webpage is again used as an example, modification listeners may be attached to elements such as an <input> element. Each listener is a function in the form of some code that is executed when the listener is triggered. The described method may inspect the <input> element to find its modification listeners, and then call those listeners directly, without having to modify an <input>. The method may then inspect results on the page, for example as described in the step of testing trial inputs of the input field. The method can also pass the function a fake <input> that records what happens to it as the function is called. For example, setting the <input>'s border to red might indicate an error state.

The method may crowdsource 205 anonymous passwords used by other users and may determine common attributes of the crowdsourced passwords that were successful. The other users may be users of a common password manager service or component associated with the input field. The characteristics of the passwords used by other users of that password manager are crowdsourced to find commonality between passwords, and thus the password criteria. The data mining may be conducted anonymously. For example, the data mining might discover that, for a particular website, everyone's passwords are at least 12 characters long so this suggests that the minimum is 12 characters, and everyone's passwords have at least one number so this suggests a minimum of one number.

With one or more of these sources consulted, the bounds or limits of password criteria can be discovered. In the event that none of the sources are available or successful, the method may fall back to using user-specified criteria for password generation.

Figure 3:
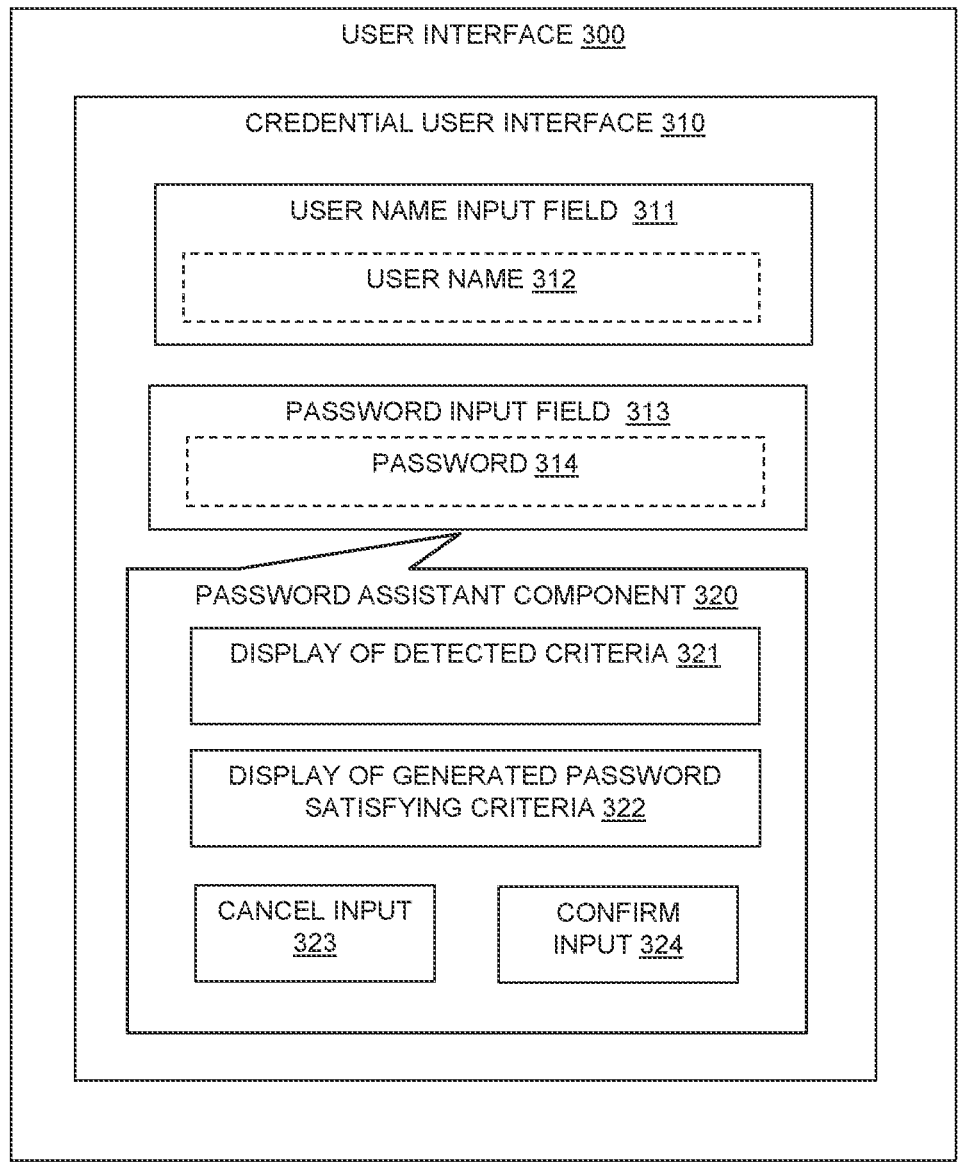
FIG. 3 is a block diagram of an example embodiment of a user interface in accordance with embodiments of the present invention.

Referring to FIG. 3, a schematic diagram shows a user interface 300 of a computing device as an example implementation of the described method. A credential user interface 310 is displayed on the user interface 300 including a username input field 311 in which a username 312 may be input by the user and a password input field 313 in which a password 314 may be input. The username 312 and the password 314 may form at least part of login credentials for access to a service or account.

Input of a username 312 in the username input field 311 may trigger an activation of a password assistant component 320 that automatically generates a compliant password in accordance with the described method. The password assistant component 320 may be the display of a background password generator as described in relation to FIG. 4 below. The password assistant component 320 may include a display 321 of detected criteria and a display 322 of a generated password satisfying the criteria. The user may confirm 324 the input of the password or may cancel 323 the input.

Figure 4:
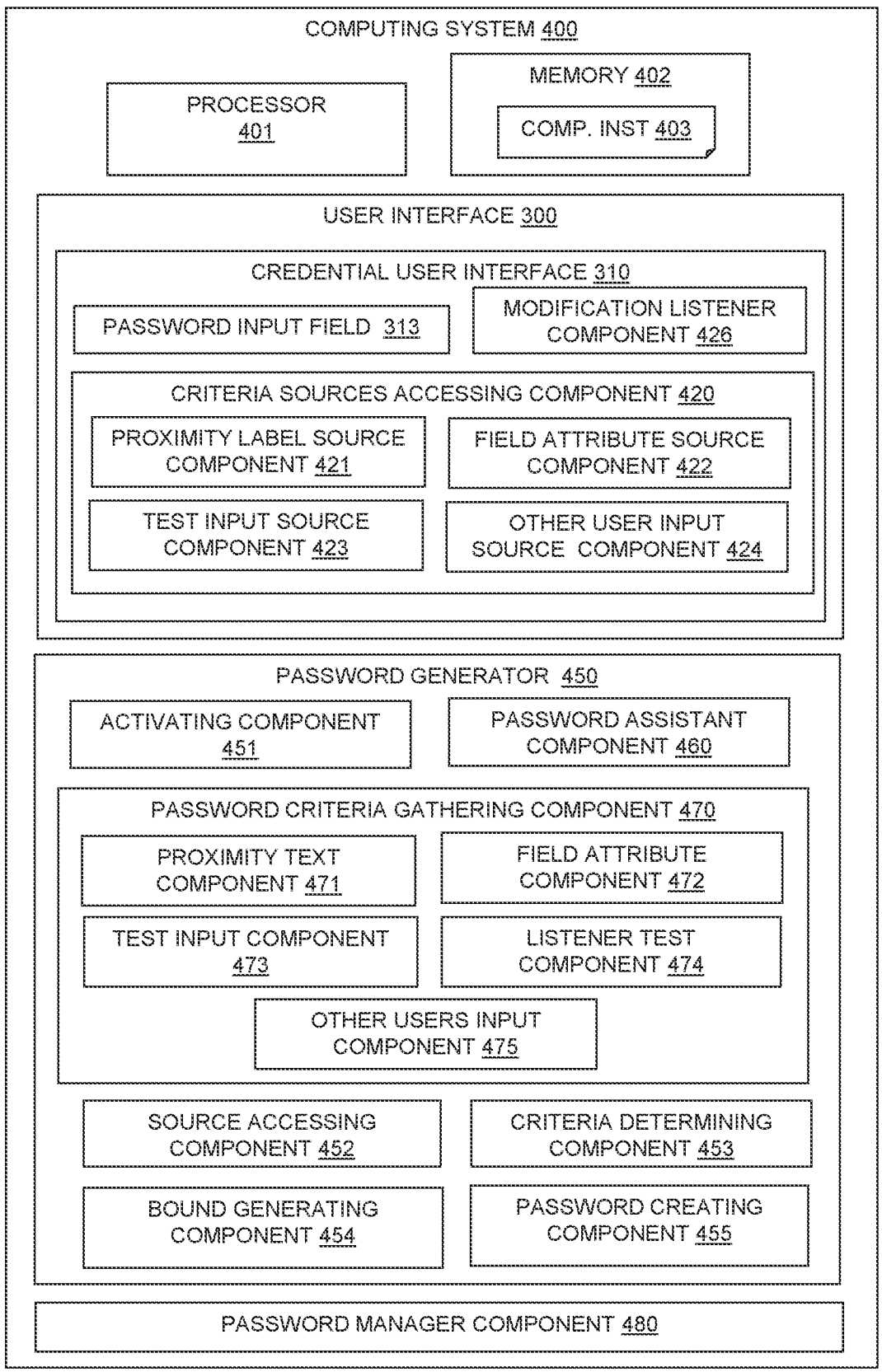
FIG. 4 is block diagram of an example embodiment of a system in accordance with embodiments of the present invention.

Referring to FIG. 4, a block diagram shows an example embodiment of a computing system 400 in which the described password generator 450 is provided.

The computing system 400 includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The computing system 400 includes a user interface 300 for displaying a credential user interface 310, for example, in the form of an account creation page or window associated with a service or account. This may, for example, be provided by a web browser operating on the computing system 400 or by the functionality of an application executed on the computing system 400 or the operating system of the computing system 400.

The credential user interface 310 includes a password input field 313. This may be in the form of an input component of the user interface 310. The input field 313 may have a hidden version for trial inputs and may have background functional components associated with the input field 313 including a listening component 426 for receiving event notifications of events in the input field 313.

The computing system 400 may have an associated password manager component 480 for assisting the user with password management including password creation and storage. The password manager component 480 may be software provided locally at the computing system 400 or remotely via a web service or as part of a web browser, for example.

The described password generator 450 gathers criteria from criteria sources related to the password input field 313 of the user interface 300. The password generator 450 may include an activating component 451 for activating password generation for a given input field. The password generator 450 may include a password criteria-gathering component 470 for gathering information from one or more sources associated with the input field. The password generator 450 may include a source accessing component 452 for accessing the one or more sources associated with the input field.

The password generator 450 may include a criteria-determining component 453 for determining password criteria from the gathered information. The password generator 450 may include a bound generating component 454 for generating bound requirements based on the determined password criteria. The password generator 450 may include a password creating component 455 for generating a randomized password meeting the bound requirements.

The password criteria gathering component 470 may include one or more of the following components:
- a proximity text component 471 for extracting text of components within a defined proximity of the input field and parsing the extracted text to determine password criteria;
- a field attribute component 472 for detecting inherent attributes of the input field;
- a test input component 473 for testing trial inputs submitted into the input field or a copy of the input field;
- a listener test component 474 for testing trial inputs submitted into a listener component that backs modification of the input field; and
- an other-users input component 475 for crowdsourcing passwords used by other users and determining common attributes of the crowdsourced passwords.

The user interface 300 includes the input field 313 that may have an associated criteria-sources-accessing component 420, including the following components that correspond to those of the password criteria gathering component 470 of the password generator 450:
- a proximity text source component 421 for extracting text of components within a defined proximity of the input field and parsing the extracted text to determine password criteria;
- a field attribute source component 422 for detecting inherent attributes of the input field;
- a test input source component 423 for testing trial inputs submitted into the input field or a copy of the input field;
- a modification listener component 426 for testing trial inputs submitted into a listener component that backs modification of the input field; and
- an other-users input source component 424 for crowdsourcing passwords used by other users and determining common attributes of the crowdsourced passwords.

The password generator 450 may be integrated into or called by a password manager component 480 associated with the input field. The password generator 450 may include a password assistant component 460 for a password assistant display including a summary of the bound requirements and the generated password suggestions.

Figure 5:
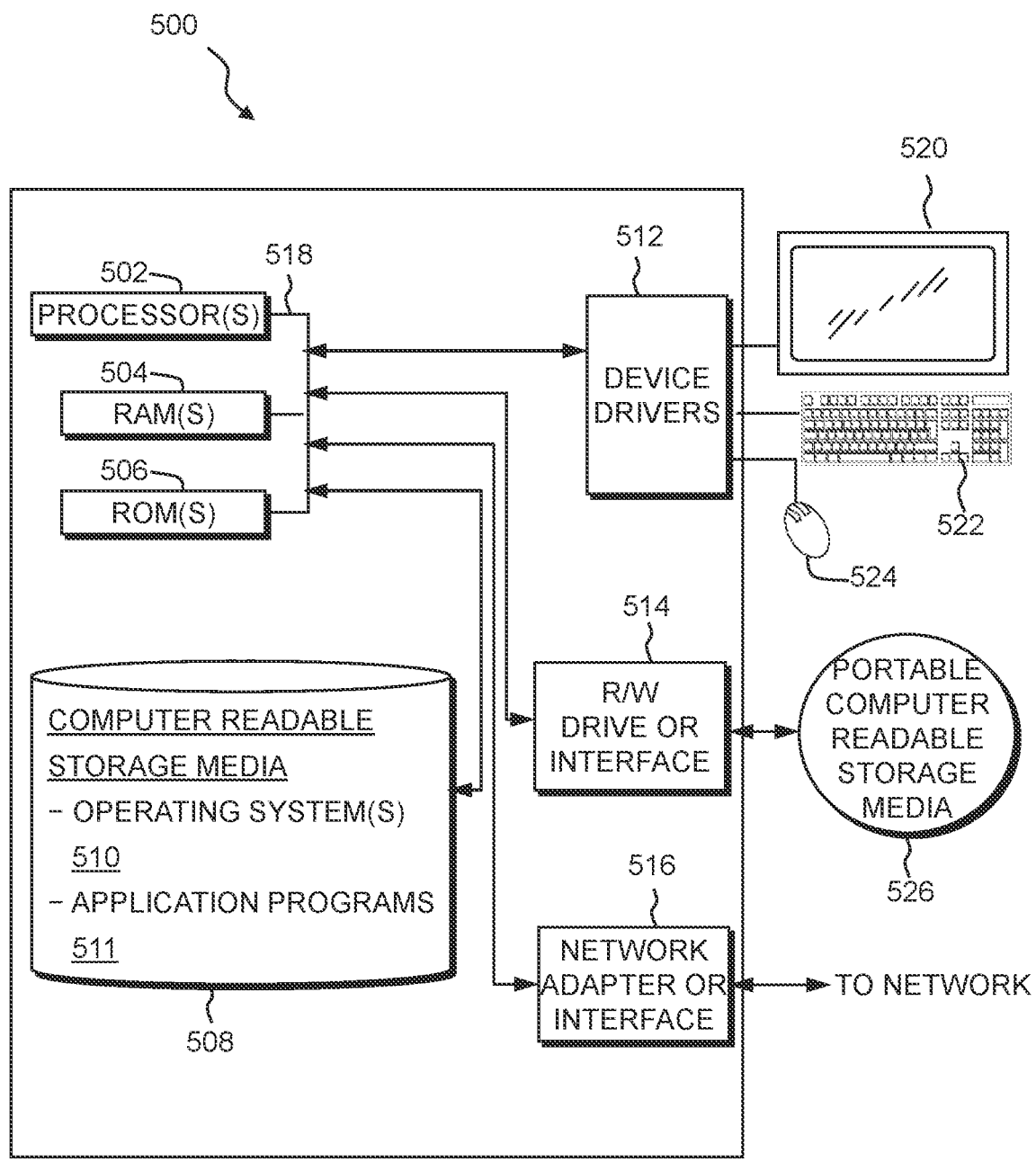
FIG. 5 is a block diagram of an embodiment of a computer system or cloud server in which embodiments of the present invention may be implemented.

FIG. 5 depicts a block diagram of components of a computing system 500 as used for the password generator 450 of computing system 400 of FIG. 4, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system 500 can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system 500 can also include a R/W drive or interface 514 to read from and write to one or more portable computer readable storage media 526. Application programs 511 on the computing system 500 can be stored on one or more of the portable computer readable storage media 526, read via the respective R/W drive or interface 514 and loaded into the respective computer readable storage media 508.

The computing system 500 can also include a network adapter or interface 516, such as a TCP/IP adapter card or wireless communication adapter. Application programs 511 on the computing system 500 can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system 500 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
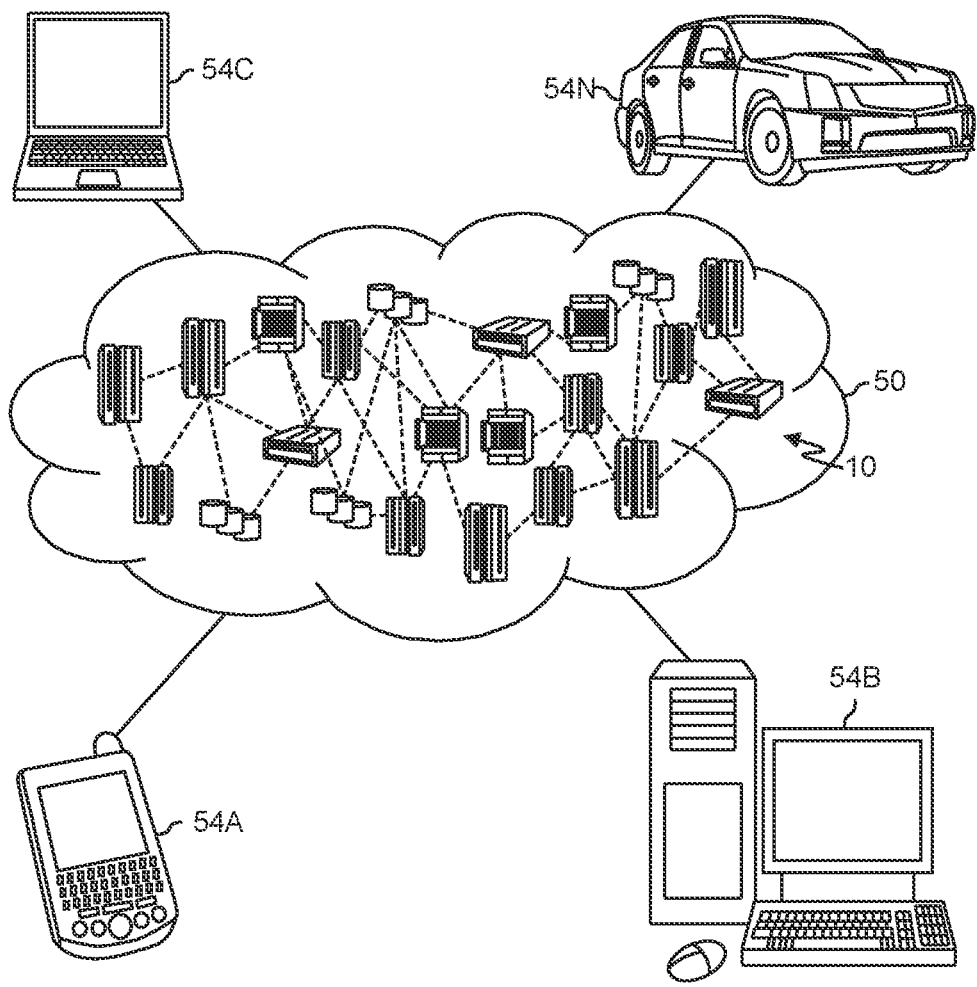
FIG. 6 is a schematic diagram of a cloud computing environment in which embodiments of the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
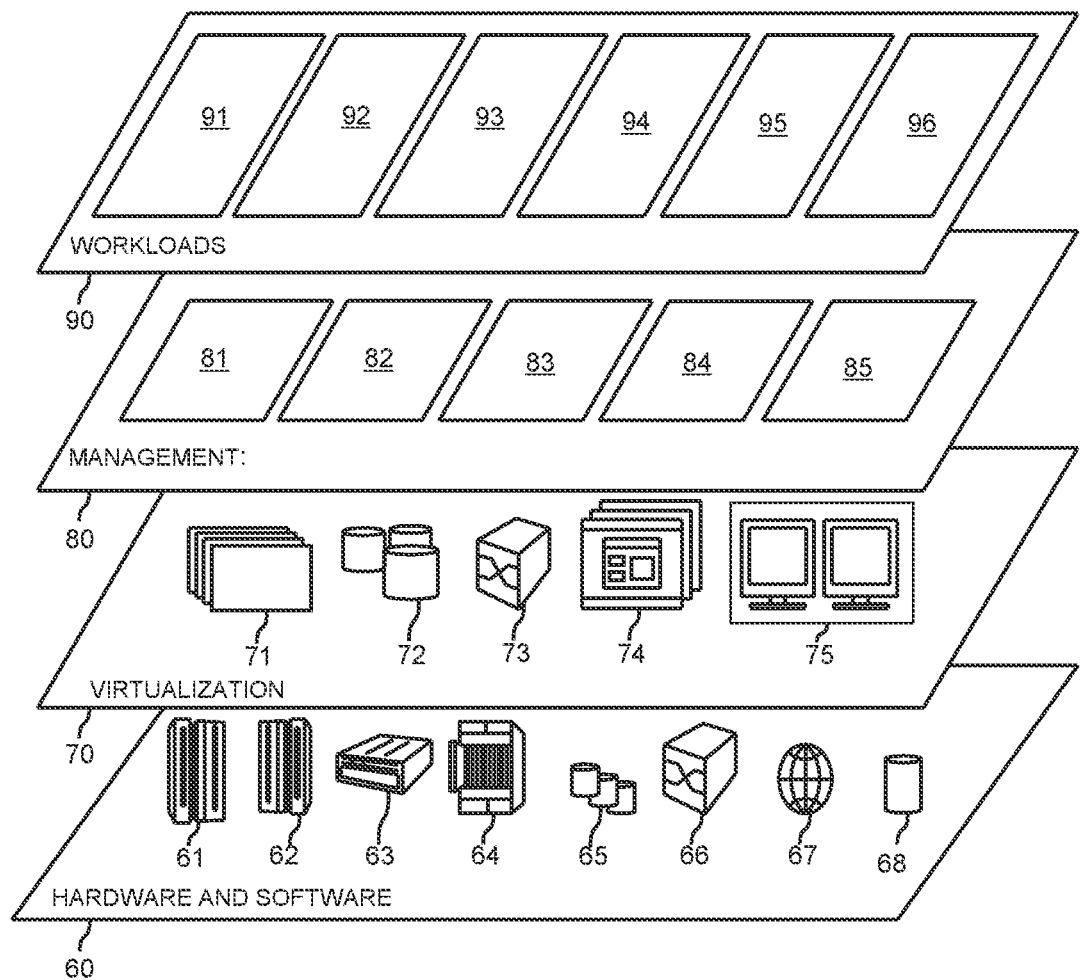
FIG. 7 is a diagram of abstraction model layers of a cloud computing environment in which embodiments of the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and password generation processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for automatic compliant password generation, said method provided by one or more processors of a computing system and comprising:
   activating password generation for a given input field, wherein the activating password generation is triggered by an action selected from the group consisting of inputting navigating to a page, a username into a username input field, and putting focus in an input field;
   gathering information from one or more sources associated with the input field, wherein the one or more sources include an attribute of the input field;
   determining password criteria from the gathered information;
   generating bound requirements based on the determined password criteria; and
   generating a randomized password meeting the bound requirements.

2. The computer-implemented method as claimed in claim 1, wherein the gathering information from one or more sources associated with the input field includes:
   extracting text within a defined proximity of the input field.

3. The computer-implemented method as claimed in claim 1, wherein the gathering information from one or more sources associated with the input field includes:
 detecting inherent attributes of the input field.

4. The computer-implemented method as claimed in claim 1, wherein the gathering information from one or more sources associated with the input field includes:
 testing trial inputs submitted into the input field or a copy of the input field.

5. The computer-implemented method as claimed in claim 1, wherein the gathering information from one or more sources associated with the input field includes:
 testing trial inputs submitted into a modification listener that backs modification of the input field.

6. The computer-implemented method as claimed in claim 1, wherein the gathering information from one or more sources associated with the input field includes:
 crowdsourcing passwords used by other users; and
 determining common attributes of the crowdsourced passwords.

7. The computer-implemented method as claimed in claim 6, wherein the other users are users of a common password manager service associated with the input field.

8. The computer-implemented method as claimed in claim 1, wherein the method is performed by a password manager service associated with the input field.

9. The computer-implemented method as claimed in claim 1, including:
 presenting a password assistant display including a summary of generated password suggestions and the bound requirements.

10. A system for automatic compliant password generation, the system comprising:
 one or more processors; and
 at least one computer readable storage medium configured to provide stored program instructions to the one or more processors, the stored program comprising program instructions to:
  activate password generation for an input field, wherein the program instructions to activate password generation is triggered by an action selected from the group consisting of inputting navigating to a page, a username into a username input field, and putting focus in an input field;
  gather information from one or more sources associated with the input field, wherein the one or more sources include an attribute of the input field;
  determine password criteria from the gathered information;
  generate bound requirements based on the determined password criteria; and
  generate a randomized password meeting the bound requirements.

11. The system as claimed in claim 10, wherein the program instructions to gather information include accessing password criteria from the one or more sources associated with the input field, wherein accessing password criteria is selected from the group consisting of extracting criteria information from available information at the sources and via a trial input into the input field.

12. The system as claimed in claim 10, wherein the program instructions to gather information from one or more sources associated with the input field includes:
 program instructions to extract text within a defined proximity of the input field; and
 program instructions to determine the password criteria by parsing the extracted text and applying natural language processing (NLP).

13. The system as claimed in claim 10, wherein the program instructions to gather information from one or more sources associated with the input field includes:
 program instructions to detect inherent attributes of the input field.

14. The system as claimed in claim 10, wherein the program instructions to gather information from one or more sources associated with the input field includes:
 program instructions to test trial inputs submitted into the input field or submitted into a copy of the input field.

15. The system as claimed in claim 10, wherein the program instructions to gather information from one or more sources associated with the input field includes:
 program instructions to test trial inputs submitted into a listener component that backs modification of the input field.

16. The system as claimed in claim 10, wherein the program instructions to gather information from one or more sources associated with the input field includes:
 program instructions to access crowdsourced passwords used by other users; and
 program instructions to determine common attributes of the crowdsourced passwords.

17. The system as claimed in claim 16, wherein the program instructions perform crowdsourcing of passwords of other users from a common password manager service.

18. The system as claimed in claim 10, wherein the system is responsive to a password manager service associated with the input field.

19. The system as claimed in claim 10, including:
 program instructions to present a summary display of generated password suggestions and the bound requirements.

20. A computer program product for automatic compliant password generation, the computer program product comprising a computer readable storage medium having program instructions embodied therewith, the program instructions executable by a processor to cause the processor to:
 activate password generation for a given input field, wherein the program instructions to activate password generation is triggered by an action selected from the group consisting of inputting navigating to a page, a username into a username input field, and putting focus in an input field;
 gather information from one or more sources associated with the input field, wherein the one or more sources include an attribute of the input field;
 determine password criteria from the gathered information;
 generate bound requirements based on the determined password criteria; and
 generate a randomized password meeting the bound requirements.

* * * * *